United States Patent
Kawano et al.

(10) Patent No.: US 11,842,513 B2
(45) Date of Patent: Dec. 12, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Atsushi Kawano, Tokyo (JP); Akifumi Tanaka, Kanagawa (JP); Ichiko Mayuzumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 234 days.

(21) Appl. No.: 17/342,335

(22) Filed: Jun. 8, 2021

(65) Prior Publication Data

US 2021/0390735 A1    Dec. 16, 2021

(30) Foreign Application Priority Data

Jun. 11, 2020   (JP) ................. 2020-101572

(51) Int. Cl.
*G06T 7/73*      (2017.01)
*G06V 40/20*     (2022.01)
*G06V 40/16*     (2022.01)

(52) U.S. Cl.
CPC ............. *G06T 7/74* (2017.01); *G06V 40/161* (2022.01); *G06V 40/23* (2022.01); *G06T 2207/10016* (2013.01); *G06T 2207/30201* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 11,610,405 B2* | 3/2023 | Petrey, Jr. | G06V 20/54 |
| 2018/0115749 A1* | 4/2018 | Toshiyuki | G08B 13/19613 |
| 2018/0300557 A1* | 10/2018 | Rodenas | G08B 13/19613 |
| 2019/0163966 A1* | 5/2019 | Moriya | H04N 7/188 |
| 2021/0042509 A1* | 2/2021 | Valiulla | G06N 20/00 |
| 2021/0390735 A1* | 12/2021 | Kawano | G06V 40/172 |
| 2022/0005204 A1* | 1/2022 | Kimura | G06V 20/52 |
| 2022/0189264 A1* | 6/2022 | Oami | G08B 13/19613 |

FOREIGN PATENT DOCUMENTS

| | | |
|---|---|---|
| WO | 2018008575 A1 | 1/2018 |
| WO | WO-2022165685 A1 * | 8/2022 |

* cited by examiner

*Primary Examiner* — Delomia L Gilliard
(74) *Attorney, Agent, or Firm* — Canon U.S.A., Inc., IP Division

(57) ABSTRACT

An image processing apparatus according to an exemplary embodiment includes one or more processors, and one or more memories storing executable instructions that, when executed by the one or more processors, cause the one or more processors to perform functions of a detection and tracking unit configured to detect and track a person by using an image obtained through capturing of a moving image, an orientation detection unit configured to detect a face orientation of the person, and an action detection unit configured to detect a suspicious action of the person, based on a cumulative value of an amount of time-series change in the face orientation.

14 Claims, 6 Drawing Sheets

IMAGE PROCESSING APPARATUS, IMAGE PROCESSING METHOD, AND STORAGE MEDIUM

BACKGROUND

Field

The present disclosure relates to an image processing technology for detecting a person's suspicious action from a captured moving image.

Description of the Related Art

Shoplifting is a serious problem for retail businesses. Conventionally, monitoring camera systems have been introduced into stores. In order to detect a sign of a shoplifting attempt and to take precautions, a technology for analyzing images captured by monitoring cameras to detect suspicious actions has been recently developed.

According to the technology discussed in International Publication WO 2018/008575, the line-of-sight direction or face direction of a person and the layout of objects around the person are obtained, and if the person facing to an object takes a face shaking action or a line-of-sight shaking action, such an action is determined to be a suspicious action.

The technology discussed in International Publication WO 2018/008575 makes it possible to detect suspicious actions to a certain degree but cannot be said to achieve high-accuracy detection of suspicious actions because a person taking a suspicious action does not always face to an object.

SUMMARY

An image processing apparatus according to an aspect of the present disclosure includes one or more processors, and one or more memories storing executable instructions that, when executed by the one or more processors, cause the one or more processors to perform functions of a detection and tracking unit configured to detect and track a person by using an image obtained through capturing of a moving image, an orientation detection unit configured to detect a face orientation of the person, and an action detection unit configured to detect a suspicious action of the person, based on a cumulative value of an amount of time-series change in the face orientation.

Further features of the present disclosure will become apparent from the following description of exemplary embodiments with reference to the attached drawings.

DESCRIPTION OF THE EMBODIMENTS

Exemplary embodiments described below are not intended to limit the present disclosure. All combinations of described features of the exemplary embodiments are not necessarily to the present disclosure. The configurations of the following exemplary embodiments are merely examples, and the present disclosure is not limited to the illustrated configurations. Identical components are described with identical reference signs.

A first exemplary embodiment of the present disclosure will be described below. In the present exemplary embodiment, a monitoring camera system installed at a retail store, such as a convenience store, is taken as an application example of an image processing apparatus. The system according to the present exemplary embodiment performs imaging with a monitoring camera installed at a store, analyzes in real time a moving image obtained through the imaging to detect a suspicious action, and notifies the suspicious action to the store staff or the like. A person who is attempting to shoplift does not always face in the direction toward objects such as goods for sale but frequently checks around him/her on the alert for any other person seeing him/her. At this time, the direction in which the person checks is likely to be the direction to an open space where there is a higher possibility that he/she may be seen by other persons. Thus, the system according to the present exemplary embodiment takes into account a space that is checked by a person who is attempting to shoplift, that is, a space where the person is likely to be seen by other persons, thus enabling detection of a suspicious action with high accuracy.

<System Configuration>

Figure 1:
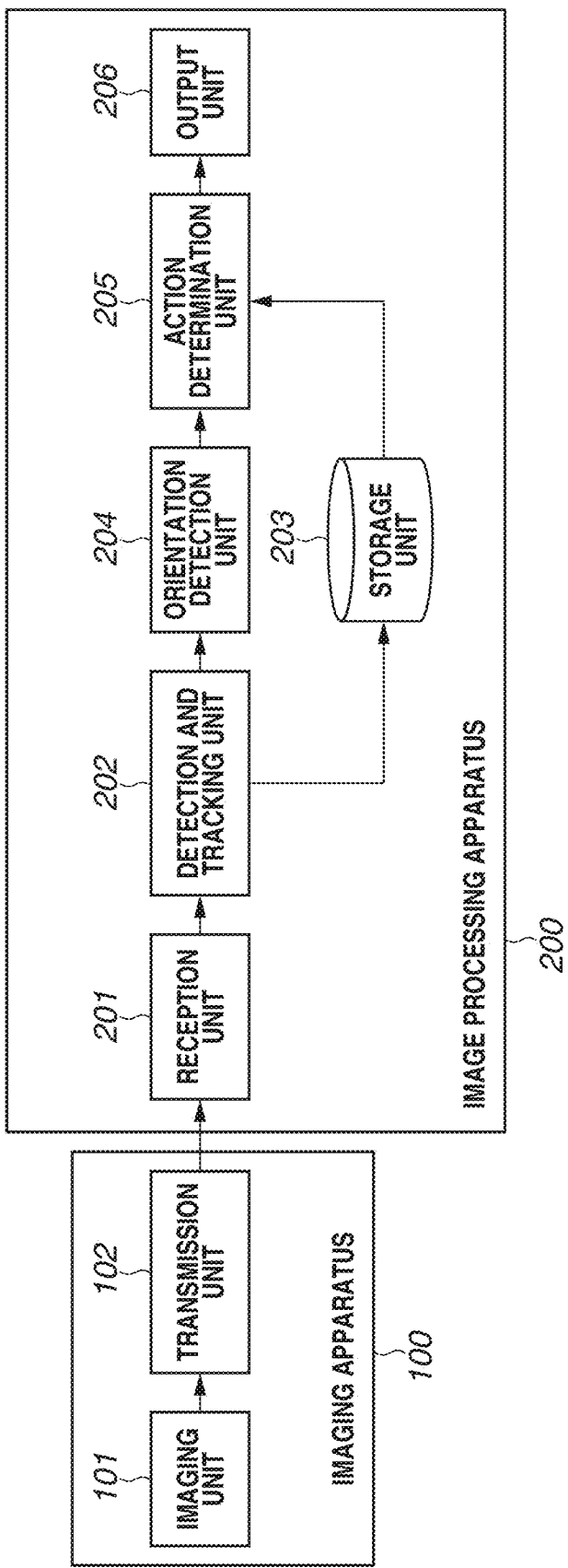
FIG. 1 is a block diagram illustrating a configuration example of an image processing apparatus in an exemplary embodiment.

FIG. 1 is a block diagram illustrating a configuration example of a monitoring system in the present exemplary embodiment. This system is broadly divided into an imaging apparatus 100 and an image processing apparatus 200.

The imaging apparatus 100 includes an imaging unit 101 and a transmission unit 102.

The imaging unit 101 includes an imaging lens, an imaging sensor, such as a CCD sensor or CMOS sensor, an image capture signal processing unit, and the like. The imaging unit 101 sends images in each frame constituting a moving image captured in frame cycles or images obtained from the moving image at predetermined time intervals to the transmission unit 102. The transmission unit 102 adds various types of information related to imaging such as the angle of view of the imaging apparatus 100 at the time of imaging and additional information such as time to the received images, converts the images into data capable of being transmitted over a network, and then transmits the data to the image processing apparatus 200.

The image processing apparatus 200 includes a reception unit 201, a detection and tracking unit 202, a storage unit 203, an orientation detection unit 204, an action determination unit 205, and an output unit 206, as functional units that execute image analysis processes for enabling detection of suspicious actions according to the present exemplary embodiment.

The reception unit 201 retrieves images from the data received from the imaging apparatus 100, and transmits the images to the detection and tracking unit 202 at the subsequent stage.

The detection and tracking unit 202 performs a detection and tracking process for detecting and tracking persons seen in the images. The detection of persons from the images can be performed by any method. For example, the detection and tracking unit 202 detects persons from the images by subjecting the edges in the images to pattern matching with a shape of a person, using a convolutional neural network (CNN) method, or using a background difference method. Each of the detected persons is represented as data indicating the central coordinates of a rectangle surrounding the person with the upper left of the image as a point of origin, and the width and height of the rectangle. The tracking process is a process of associating a detected person with a plurality of images in the time direction. The tracking process can be performed by any method. For example, the detection and tracking unit 202 predicts the position of a person in the current frame from the center position of a person included in the previous frame and a movement vector, and associates these persons with each other based on the predicted position of the person and the center position of the person included in the current frame. The detection and tracking unit 202 assigns a person ID (identification information) to the associated persons. Thus, the persons assigned with the same person ID will be treated afterwards as the identical person. The detection and tracking unit 202 implements the tracking of each person by repeating this process in the frames in the time direction.

The storage unit 203 stores the coordinates of a person in the images for each person ID obtained by the detection and tracking unit 202.

The detection and tracking unit 202 also connects in a time-series manner the coordinates of the person for each person ID stored in the storage unit 203, thus obtaining trajectory information indicating the movement path of the person. The storage unit 203 also stores the trajectory information indicating the movement trajectory obtained for each person ID by the detection and tracking unit 202.

The orientation detection unit 204 detects the orientation of a face of the person for each person ID obtained by the detection and tracking unit 202. The orientation detection unit 204 detects the region of the person's face, further detects parts, such as eyes, in the face, and detects the orientation of the face of the person from the positional relationships of the facial parts. The detection may be performed using a method similar to the method for the person detection process by the detection and tracking unit 202, for example, a method of pattern matching with a face shape or a CNN method. As results of the face orientation detection, the orientation detection unit 204 obtains data represented by the inclination angle of the face, the vertical angle of the face, the horizontal angle of the face, and the like. However, if a back of a persons head is presented such that the person's face, facial parts, or face orientation cannot be detected, the orientation detection unit 204 sets data serving as the results of face orientation process to data with no values for the inclination angle of the face, the vertical angle of the face, and the horizontal angle of the face. The method for face orientation detection is not limited to the foregoing method but may be a method using CNN or a template matching method, for example.

The action determination unit 205 uses the results of face orientation detection made by the orientation detection unit 204 and the trajectory information stored in the storage unit 203 to determine whether each of the persons assigned with the person IDs has taken a suspicious action. In the present exemplary embodiment, the action determination unit 205 performs determination as to whether there is a face shaking action and determination on the direction of high visibility described below, based on the results of face orientation detection and the trajectory information stored in the storage unit 203, and performs a suspicious action determination process on the person based on the determination results. In response to detection of any person's suspicious action, the action determination unit 205 transmits a suspicious action detection notification indicating the detection results to the output unit 206. The suspicious action determination and detection processes which is performed by the action determination unit 205 will be described below in detail.

In a case where the suspicious action detection notification from the action determination unit 205 is received, the output unit 206 displays an image in which a predetermined rectangular mark, for example, is appended for emphasis to the region of the person of which the suspicious action has been detected, on a monitor screen (not illustrated). Thus, it is possible to inform the administrator of the monitoring camera, the store staff, and the like about the person of which the suspicious action has been detected. The image of the same person may be transmitted to a mobile terminal of the administrator, store staff, or the like in order to urge them to take precautions. The operations of the output unit 206 that has received a suspicious action detection notification are not limited thereto but may be various other actions related to preventive measures against shoplifting.

Hereinafter, detailed description will be provided as to the determination on face shaking action and the determination on the direction of high visibility performed by the action determination unit 205 according to the present exemplary embodiment using the face orientation detection results ads trajectory information for each person ID, and the suspicious action determination and detection process performed by the action determination unit 205 according to the present exemplary embodiment based on the determination results.

<Determination on Face Shaking Action>

First, the determination that a face shaking action, which is one of suspicious actions taken by a person will be described.

In the present exemplary embodiment, a face shaking action, as one of suspicious actions, is an action of a person changing his/her face orientation to check around him/her. In the present exemplary embodiment, the action determination unit 205 determines the magnitude of time-series change in the face orientation, that is, the amount of time-series change in the face orientation from the face orientation detection results, and internally holds the amount of time-series change as a determination score. The action determination unit 205 determines whether the person has taken a face shaking action based on the determination score. At this time, the action determination unit 205 calculates the absolute values of differences between the face orientation detection results obtained from two images continuous in the time direction for each person ID. Specifically, the action determination unit 205 calculates the absolute value of difference in the inclination angle of the face, the absolute value of difference in the vertical angle of the face, and the absolute value of difference in the horizontal angle of the face, in the two images. If one or more of the absolute values of differences in the angles exceed a face orientation threshold value, the action determination unit 205 determines that the face orientation has abruptly changed, and increases the determination score. If the difference absolute values are all equal to or smaller than the face orientation threshold value, the action determination unit 205 determines that the face orientation is stable and decreases the determination score.

A specific example will be described. Results of person's face orientation detection are represented by the inclination angle of the face, the vertical angle of the face, and the horizontal angle of the face as described above. For example, assume that the result of the person's face orientation detection at time t−1 is {the inclination angle of the face, the vertical angle of the face, the horizontal angle of the face}={+5, −10, −15}, the result of the face orientation detection at time t is {+5, −15, +50}, and the face orientation threshold value is 50. In this example, the absolute values of the differences between the face orientation detection results at time t and time t−1 are {0, 0, 65}, and any one or more of the items in the face orientation detection results are greater than the face orientation threshold value. Thus, the action determination unit 205 determines that the face orientation has abruptly changed, and increases the determination score. For example, if all the items in the face orientation detection results are equal to or less than the face orientation threshold value, the action determination unit 205 determines that the face orientation is stable, and decreases the determination score. With each change of the determination score, the action determination unit 205 compares the determination score with a predetermined determination threshold value. If the determination score exceeds the determination threshold value, the action determination unit 205 determines that the person has taken a face shaking action.

In the examples described above, the face orientation threshold value is one value. Alternatively, different face orientation threshold values may be set for each item of the face orientation detection results. The face orientation threshold value, the determination threshold value, and an amount of increase and an amount of decrease of the determination score may be determined by preliminary experiment, may be determined by the behavior of a person in a monitoring camera, or may be determined by simulation using a large number of images with a label of face shaking action or a label of non-face shaking action.

<Determination on Direction of High Visibility>

Next, the determination on the direction of high visibility will be described.

In the present exemplary embodiment, the direction of high visibility indicates a direction in which no object obstructing vision is present within a certain distance from a person with respect to a certain direction.

In the present exemplary embodiment, prior to the determination on the direction of high visibility, the image is divided into regions where the presence of a person is possible (hereinafter, referred to as possible regions) and regions where the presence of a person is impossible (hereinafter, referred to as impossible regions). In the present exemplary embodiment, the possible regions and the impossible regions are set using the trajectory information for a plurality of persons held in the storage unit 203. In the present exemplary embodiment, as an example, the action determination unit 205 automatically sets the possible regions and the impossible regions based on the trajectory information in the storage unit 203. Alternatively, for example, a separately provided setting unit (not illustrated) may set the possible regions and the impossible regions, or the administrator of the monitoring camera may input the possible regions and the impossible regions. If the administrator of the monitoring camera is supposed to set the possible regions and the impossible regions, the image is displayed on the monitor screen, for example, and the administrator of the monitoring camera manually sets the possible regions and the impossible regions by operating a mouse, for example.

Figure 2:
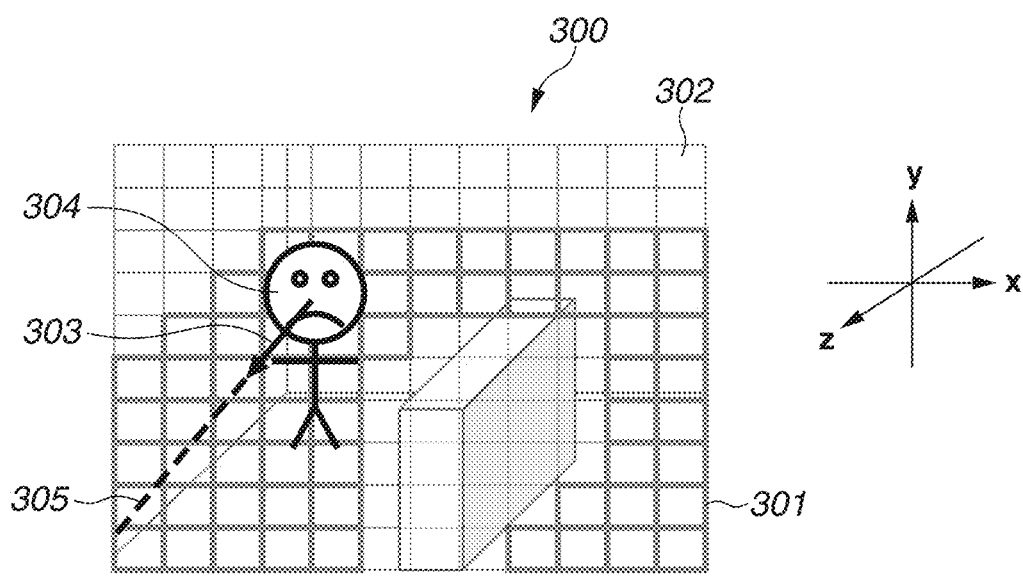
FIG. 2 is a diagram illustrating an example of possible regions and impossible regions, and a face direction of a person.

FIG. 2 illustrates an example where the image is segmented into a plurality of grid-like small regions, and the possible region or the impossible region is set for each of the small regions. The possible region is set to a small region where person's trajectory information is statistically present, and the impossible region is set to a small region where no person's trajectory information is statistically present. In other words, the possible regions indicate that, in the regions, there is no obstacle to at least such an extent that a person can move and that there is no object that blocks a person's line of sight. The impossible regions indicate that, in the regions, there is an obstacle that makes a person's movement difficult, and that there is an object that blocks a person's line of sight. In the present exemplary embodiment, the regions in which the trajectories of persons are present in a predetermined amount or more are regarded as the possible regions, and the regions in which the trajectories of persons are present in an amount smaller than the predetermined amount are regarded as the impossible regions. For example, the action determination unit 205 sets, to possible regions, small regions where there exist movement trajectories of persons accounting for a predetermined percentage or more (for example, 5% or more) of a plurality of persons appearing in the image based on the trajectory information for a predetermined past period (for example, for one day in the past). The action determination unit 205 sets the remaining small regions that have not been set to the possible regions, to the impossible regions. FIG. 2 illustrates an example where an image 300 is segmented into a plurality of grid-like small regions, small regions 301 indicated by thick lines in FIG. 2 are set to the possible regions, and small regions 302 indicated by fine lines in FIG. 2 are set to the impossible regions.

The predetermined amount used for setting the possible regions may take on a value determined by preliminary experiment, a value determined by behavior of persons seen on the monitoring camera, or a value determined by simulation using a large number of images where moving persons are seen. In addition, if the administrator of the monitoring camera is supposed to set the possible regions and the impossible regions, for example, the image displayed on the monitor screen or the like may be segmented into grid-like small regions as illustrated in FIG. 2.

The action determination unit 205 further performs the processing of determination on the direction of high visibility, based on the information on the face orientation of the person detected by the orientation detection unit 204 and the possible regions and the impossible regions set as described above. In the present exemplary embodiment, if the possible regions are continuous from the center of the person's face to the end of the image along the direction of the face orientation, the action determination unit 205 determines that the line-of-sight direction of the person is the direction of high visibility, that is, the person has looked in the direction of high visibility at that time. For example, referring to FIG. 2, an arrow 303 indicates the face orientation of a person 304, a line segment 305 indicates from the center of the face of the person 304 to the end of the image, and the small regions on the line segment 305 are all set to the possible regions. Thus, the action determination unit 205 determines that the line-of-sight direction of the person 304 is the direction of high visibility, that is, the person 304 has looked in the direction of high visibility. If one or more small regions belonging to the impossible region are included in the small regions from the center of face of the person 304 to the end of the image, the action determination unit 205 determines that the person has not looked in the direction of high visibility.

As described above, the possible regions are places where the trajectories of persons are present in a predetermined amount or more, there is no obstacle to at least such an extent that a person can move, and there is no object that blocks a person's line of sight. Thus, as illustrated in FIG. 2, that the line segment 305 to the end of the image along the direction of the face orientation belongs to only the possible regions can be regarded that the person has looked in the direction of high visibility. The impossible regions are places where the trajectories of persons are present in an amount less than the predetermined amount, there is an obstacle that makes a person's movement difficult, and there is an object that blocks a person's line of sight. Thus, as illustrated in FIG. 2, if one or more of small regions belonging to the impossible regions in the line segment to the end of the image along the direction of face orientation are present, it can be regarded that the person has looked in the direction of low visibility.

The action determination unit 205 performs determination on a suspicious action of the person, based on results of determination on face shaking action and results of determination on the direction of high visibility.

In the present exemplary embodiment, the action determination unit 205 internally holds a suspicion score for each person ID. As in the face shaking determination process described above, if the face orientation has abruptly changed, the action determination unit 205 increases the suspicion score corresponding to the person ID. For the suspicious action determination, as in the face shaking determination described above, the action determination unit 205 determines the amount of time-series change in the face orientation from the results of the face orientation detection, and holds a cumulative value of amount of time-series change as a suspicion score. The action determination unit 205 then determines whether the person has taken a suspicious action based on the suspicion score. For example, as in the face shaking action determination process, if the face orientation of the person has abruptly changed, the action determination unit 205 increases the suspicion score corresponding to the person ID. Additionally, in a case where the action determination unit 205 determines that the person has looked in the direction of high visibility from the results of the determination on the direction of high visibility described above, the action determination unit 205 adds a bonus score to the suspicion score, that is, further increases the suspicion score. As in the face shaking action determination process, in a case where the action determination unit 205 determines that the face orientation of the person is stable, the action determination unit 205 decrements the suspicion score corresponding to the person ID. With each change of the suspicion score, the action determination unit 205 compares the suspicion score with a predetermined suspicion determination threshold value. In a case where the suspicion score exceeds the suspicion determination threshold value, the action determination unit 205 determines that the person has taken a suspicion action. In a case where the suspicion score is equal to or less than the suspicion determination threshold value, the action determination unit 205 determines that the person has not taken a suspicious action.

The suspicion determination threshold value, and the amount of increase of the suspicion score and the amount of decrease of the suspicion score are preset in consideration of persons' actions. For the setting, a value determined by preliminary experiment, a value determined by the behavior of persons seen on the monitoring camera, or a value determined by simulation using a large number of images with a label of face shaking action or a label of non-face shaking action may be used. It is desirable that the images used for the setting are set based on a plurality of images in which shoplifters or shoplifting suspects are seen, for example.

In the present exemplary embodiment, FIG. 2 illustrates an example where the image 300 is segmented into 10×12 small regions. However, it is desirable that the number of segments is adjusted in accordance with the angle of view at the capturing of the image 300 and the size of the image 300. However, if the image is segmented more finely, the density of the trajectory information becomes relatively low so that some impossible regions may appear among the possible regions depending on how the person moves. In this case, it is desirable to increase the amount of the trajectory information and add a process of set an impossible region surrounded by the possible regions to the possible region.

<Description of Operations of the System>

Figure 3:
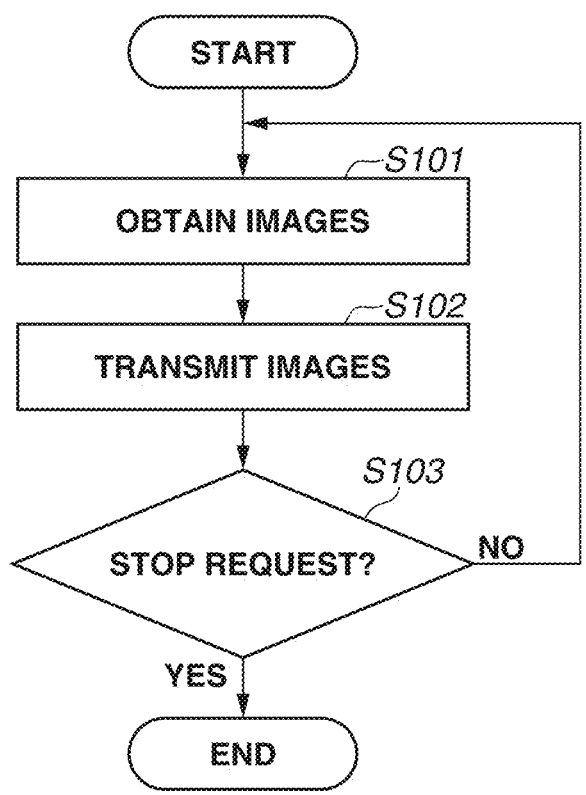
FIG. 3 is a flowchart illustrating operations of an imaging apparatus.

Processing performed by the imaging apparatus 100 according to the present exemplary embodiment will be described with reference to the flowchart of FIG. 3.

First, in step S101, the imaging unit 101 of the imaging apparatus 100 captures a moving image and obtains images at a predetermined frame rate.

In step S102, the transmission unit 102 appends the unique number of the imaging apparatus 100 and time information to the images obtained by the imaging unit 101, processes the images into a format transmissible over a network, and transmits the images.

In step S103, the imaging apparatus 100 determines whether a request for stopping the image transmission has been made. As far as no stop request has been made (NO in step S103), the imaging apparatus 100 repeats the image obtaining process in step S101 and the image transmission process in step S102.

Figure 4:
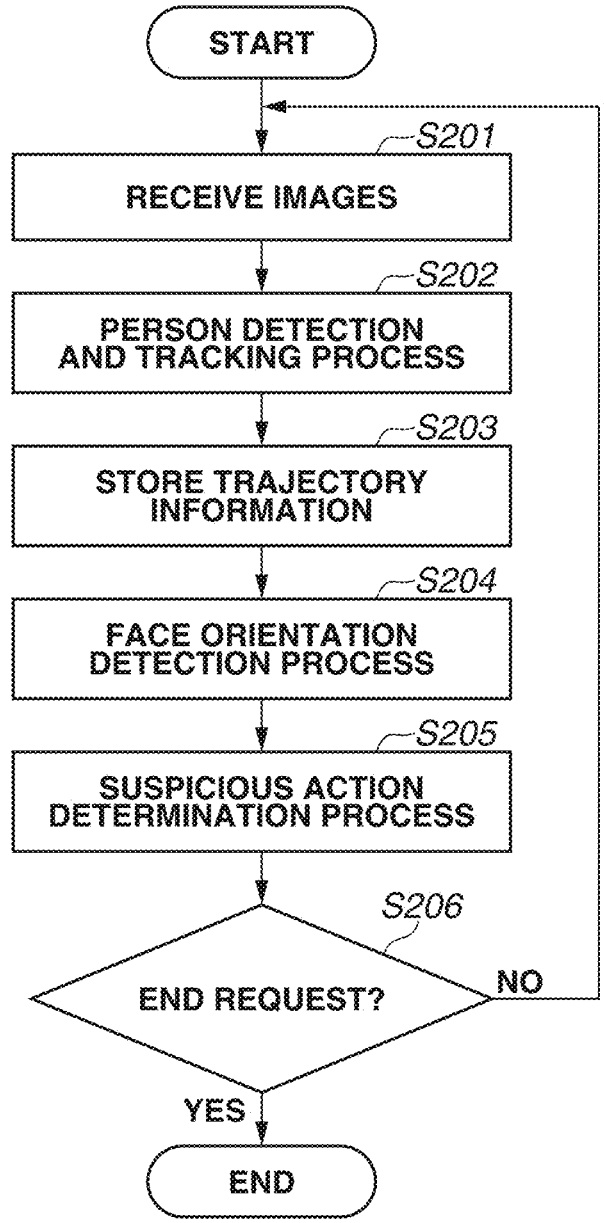
FIG. 4 is a flowchart of an image analysis process executed by the image processing apparatus.

The suspicious action determination process by the image processing apparatus 200 according to the present exemplary embodiment will be described with reference to the flowchart of FIG. 4.

First, in step S201, the reception unit 201 of the image processing apparatus 200 receives the images transmitted from the imaging apparatus 100. The reception unit 201 transmits the received images to the detection and tracking unit 202.

Next, in step S202, the detection and tracking unit 202 performs the person detection and tracking process of detecting and tracking persons in the images transmitted from the reception unit 201. The detection and tracking unit 202 generates metadata, such as the coordinates of rectangles indicating the persons in the images as the results of person detection, and the person Ins and the coordinates in the image as the results of the tracking process.

In step S203, the storage unit 203 stores the person detection results, tracking information, and meta data generated in step S202.

In step S204, the orientation detection unit 204 performs the face orientation detection process on each of the persons detected by the detection and tracking unit 202.

Next in step S205, the action determination unit 205 performs the person's suspicious action detection process using the results of the face orientation detection in step S204 and the trajectory information in step S203. If the action determination unit 205 detects any suspicious action, the output unit 206 notifies the suspicious action to the store staff and the like.

The above-described processes are performed every time an image is obtained. In step S206, the image processing apparatus 200 determines whether a request for ending the image analysis process has been made. As far as no end request has been made (NO in step S206), the processing returns to step S201 and the image processing apparatus 200 repeats the operations in steps S201 to S205.

As described above, in the system of the present exemplary embodiment, the suspicious action detection process is performed taking into account the direction of high visibility from the person in addition to the face orientation of a person. For example, in-store customers usually turn their eyes toward store shelves and their surroundings, looking for desired products. According to the technology discussed in WO 2018/008575, for example, such a normal customer action may be wrongly detected as a suspicious action. On the contrary, in the present exemplary embodiment, the suspicious action determination is performed taking into account the direction of high visibility from a person, which makes it possible to determine the person's suspicious action such as checking if any other person is seeing him/her.

In the present exemplary embodiment, as an example, a face shaking action detected by the face orientation detection is determined to be one of suspicious actions. This advantageous effect can be produced not only by the face orientation detection but also by using a technology for detecting the line-of-sight direction of a person. The present exemplary embodiment is applicable not only to the detection of a face shaking action but also to the detection of an action of checking for the presence of any other person seeing the person, such as an action of staring in a certain direction, as a suspicious action.

In the present exemplary embodiment, as an example, processing is performed in accordance with the frame rate of capturing a moving image by the imaging apparatus 100, that is, all the images in a moving image are processed. However, the detection and tracking unit 202, the orientation detection unit 204, and the action determination unit 205 do not necessarily need to process all the images. In general, it is desirable that the tracking process be performed at a high frame rate, whereas the face shaking action can be determined even at a lower frame rate than the frame rate in the tracking process. Thus, sufficient advantageous effects can be obtained even if the detection and tracking unit 202 performs the processing at a high frame rate and the action determination unit 205 and the action determination unit 205 perform the processing at a frame rate that is lowered by reducing the number of frames, for example.

A second exemplary embodiment of the present disclosure will be described below. In the second exemplary embodiment, in addition to the foregoing descriptions of the first exemplary embodiment, a system that determines a suspicious action taking into account store equipment ahead in the direction of high visibility, and notifies the determination results to the store staff and the like. In the second exemplary embodiment, a weight is assigned to the direction of high visibility, and suspicious action determination is made based on the weight. In the present exemplary embodiment, the weight can be assigned to the direction of high visibility via, for example, a user interface (UI) screen. In the present exemplary embodiment, the weight may be assigned to the direction of high visibility in accordance with the type of equipment ahead in the direction of high visibility or may be assigned based on the features of persons having taken suspicious actions in the past.

The structures of functional units of the system according to the second exemplary embodiment are similar to those of the first exemplary embodiment illustrated in FIG. 1, and thus illustration of the functional units is omitted. The configurations and operations of the functional units of an imaging apparatus 100 are similar to those described above. The imaging apparatus 100 includes a reception unit 201, a detection and tracking unit 202, a storage unit 203, an orientation detection unit 204, and an output unit 206 that are similar to those described above, and thus descriptions of these units will be omitted. The second exemplary embodiment is different from the first exemplary embodiment in the processing performed by an action determination unit 205 in the image processing apparatus 200.

In the second exemplary embodiment, in addition to the above-described functions in the first exemplary embodiment, the action determination unit 205 includes a function of an equipment direction setting unit (not illustrated). The facility direction setting unit sets the direction toward store equipment with respect to the angle of view at which the imaging apparatus 100 performs image capturing.

The store equipment here includes a cash register, doorway, staff entrance, back office, warehouse, and the like, where mainly store staff is likely to be present. In the present exemplary embodiment, as a weight for the direction of high visibility, a degree of importance is set to the store equipment.

Figure 5:
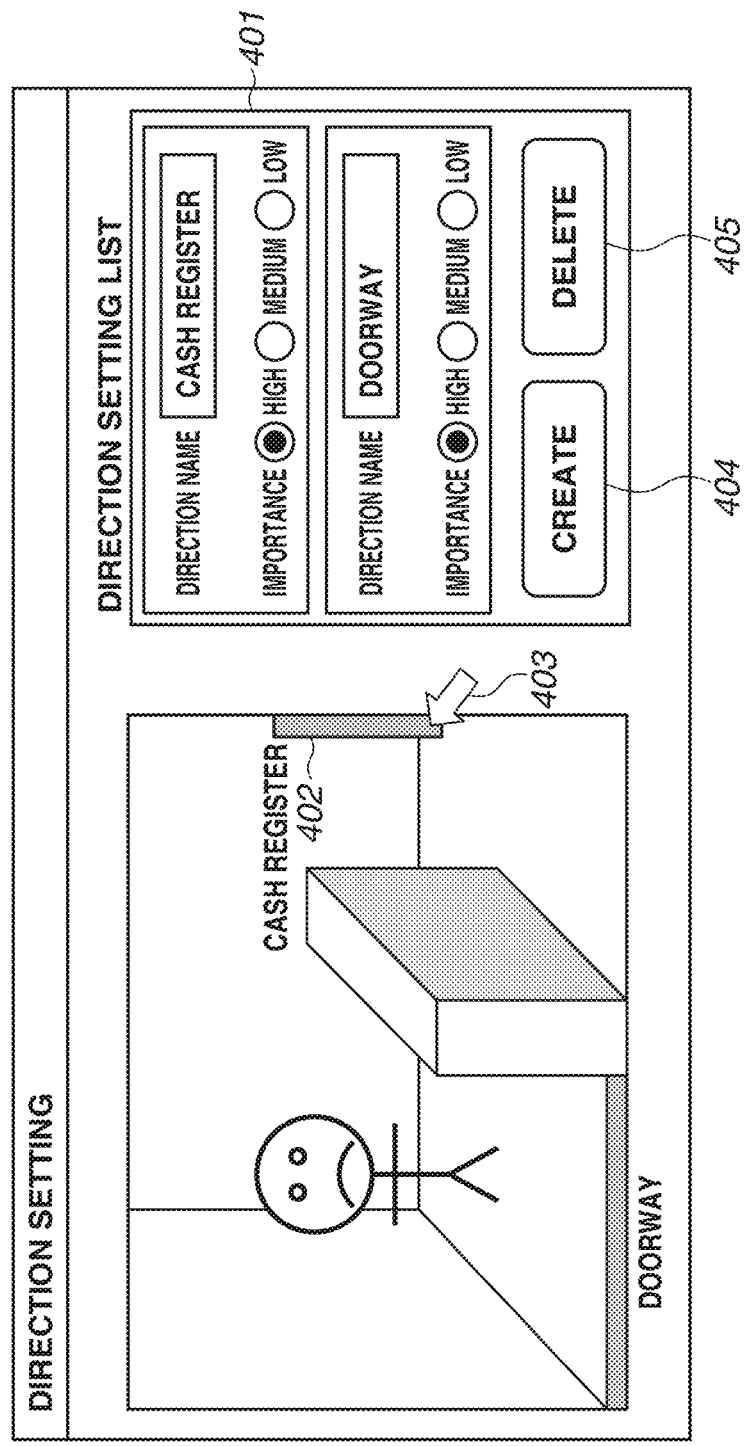
FIG. 5 is a diagram illustrating an example of a user interface (UI) for direction setting.

FIG. 5 illustrates an example of an UI screen displayed on a monitor screen installed, for example, in a monitoring room or the like where video images from a monitoring camera are monitored in setting the facility direction. In the UI screen illustrated in FIG. 5, a direction setting list 401 is a list for managing the name of direction, the degree of importance of the set direction, and the region in the image, in association with one another. In the example of FIG. 5, the importance has three degrees of high, medium, and low, but this is merely an example. The degrees of importance may be further subdivided. In the UI screen example in FIG. 5, the direction toward a cash register and the direction toward a doorway are set, and a region 402 is a region associated with the direction toward a cash register in the image. Each direction is set by a mouse cursor 403 being operated to a surrounding area of the image. In order to increase or decrease the direction settings, a create button 404 in the UI screen of FIG. 5 is clicked with the mouse or the like to add a direction setting, and a delete button 405 is pressed in a state that any of the direction settings is selected to delete the direction setting.

In the second exemplary embodiment, in addition to the above-described suspicious action determination process in the first exemplary embodiment, the action determination unit 205 executes a suspicious action determination process in which the equipment direction settings described above is taken into account. That is, the action determination unit 205 in the second exemplary embodiment makes a determination on a person's suspicious action and performs detection of a person's suspicious action, based on the result of face shaking action determination, the result of determination on the direction of high visibility, and the result of equipment direction settings.

In the second exemplary embodiment, as in the first exemplary embodiment, the action determination unit 205 holds the suspicion score for each person ID. If the face orientation of any person has abruptly changed, the action determination unit 205 increases the suspicion score corresponding to the person ID. In the second exemplary embodiment, in addition to this, if a person has looked in the direction of high visibility, the action determination unit 205 adjusts the bonus score to be added to the suspicion score in accordance with the degree of importance of the direction setting ahead in the direction of face orientation. For example, in comparison to a case without a direction setting, the action determination unit 205 multiplies the bonus score to be added to the suspicion score by three for a high degree of importance, multiplies the bonus score to be added to the suspicion score by two for a medium degree of importance, and multiplies the bonus score to be added to the suspicion score by one for a low degree of importance. If the face orientation of a determined person is stable, the action determination unit 205 decreases the suspicion score as in the first exemplary embodiment. With each change of the suspicion score, the action determination unit 205 compares the suspicion score with a suspicion determination threshold value. If the suspicion score exceeds the suspicion determination threshold value, the action determination unit 205 determines that the person has taken a suspicious action. If the suspicion score is equal to or smaller than the suspicion determination threshold value, the action determination unit 205 determines that the person has not taken a suspicious action.

In the second exemplary embodiment, the adjustment of the bonus score is preset in consideration of persons' actions. For the setting, a value determined by preliminary experiment, a value determined by the behavior of persons seen on the monitoring camera, or a value determined by simulation using a large number of images with a label of face shaking action or a label of non-face shaking action may be used. It is desirable that the images used for the setting be set based on a plurality of images in which shoplifters or shoplifting suspects are seen, for example.

As described above, in the system according to the second exemplary embodiment, suspicious actions are determined taking into account the store equipment ahead in the direction of high visibility in addition to the direction of face orientation and the direction of high visibility from the person. For example, for a person who is attempting to shoplift, the direction toward the cash register where store staff waits and the direction toward the doorway on the escape route are important directions to be checked. According to the second exemplary embodiment, it is possible to determine suspicious actions with high accuracy by taking into account the important directions to be checked, such as the direction toward the cash register and the direction toward the doorway on the escape route.

In the present exemplary embodiment, as an example, the direction settings are manually made by the administrator of the system or the store staff via the UI screen for equipment direction setting. However, the setting of a degree of importance to each direction is not limited to the above-described setting example. For example, moving images are recorded, shoplifters or suspicious persons seen in the moving images, that is, persons having shoplifted in the past, are selected by an operation of a mouse cursor or the like, and then the selected persons' actions are analyzed. Then, the directions in which the persons have been staring and checking are extracted, and the high degree of importance is set to the extracted directions. Thus, higher-accuracy suspicious action determination is achieved. That is, the weights are assigned to the directions of high visibility based on the features of persons who have taken suspicious actions in the past, so that suspicious actions can be determined with higher accuracy.

A third exemplary embodiment of the present disclosure will be described below in a system according to the third exemplary embodiment, in addition to the above-described processes in the first exemplary embodiment, suspicious action determination is performed taking into account not only the face orientation but also the direction in which a person faces, and a determination result is notified of to the store staff and the like. In the third exemplary embodiment, it is possible to determine a suspicious action of a backward facing person, that is, a suspicious action of a person with his/her back facing the monitoring camera.

The configurations of functional units of the system according to the third exemplary embodiment are similar to those of the first exemplary embodiment illustrated in FIG. 1, and thus illustrations of the functional units are omitted. The configurations and operations of the functional units of an imaging apparatus 100 are similar to those described above. The imaging apparatus 100 includes a reception unit 201, a detection and tracking unit 202, a storage unit 203, an orientation detection unit 204, and an output unit 206 that are similar to those described above, and thus descriptions of these units will be omitted. The third exemplary embodiment is different from the first exemplary embodiment in the processing performed by an action determination unit 205 in the image processing apparatus 200.

In the third exemplary embodiment, in addition to the above-described functions in the first exemplary embodiment, the action determination unit 205 determines and detects a suspicious action taking into account the direction in which a person faces. That is, the action determination unit 205 in the third exemplary embodiment determines suspicious action of a person, based on a result of face shaking action determination, a result of determination on the direction of high visibility, and the direction in which a person faces.

The action determination unit 205 in the third exemplary embodiment obtains the movement direction of a person from the trajectory information of the person stored in the storage unit 203, and determines the direction in which the person faces with respect to the imaging apparatus 100 (i.e., the monitoring camera), based on the information on the movement direction. For example, in a case where the movement direction of the person is a direction toward the imaging apparatus 100, the action determination unit 205 determines that the person faces forward with respect to the imaging apparatus 100. If the movement direction of the person is a direction away from the imaging apparatus 100, the action determination unit 205 determines that the person faces backward (his/her back is turned to the monitoring camera).

The action determination unit 205 changes a combination of the face orientation and the trajectory information of the person between a case where the person faces forward and a case where the person faces backward to detect a person's suspicious action. That is, in the third exemplary embodiment, as in the first exemplary embodiment, the action determination unit 205 holds the suspicion score described above for each person ID, and if the person faces forward and the face orientation of the person has abruptly changed, the action determination unit 205 increases the suspicion score. If the person faces backward and the face orientation of the person is detected by the orientation detection unit 204, that is, if the profile of the person who has faced backward is detected when the person turns sideways, the action determination unit 205 increases the suspicion score. If the face orientation of the person facing backward is not detected, the action determination unit 205 decreases the suspicion score. In addition, in a case where the person facing backward looks in the direction of high visibility, the action determination unit 205 increases the suspicion score by adding the bonus score to the suspicion score. In a case where the face orientation is stable, the action determination unit 205 decreases the suspicion score as in the face shaking action determination process. As described above, with each change of the suspicion score, the action determination unit 205 compares the suspicion score with the suspicion determination threshold value. If the suspicion score exceeds the suspicion determination threshold value, the action determination unit 205 determines that the person has taken a suspicious action. If the suspicion score is equal to or less than the suspicion determination threshold value, the action determination unit 205 determines that the person has not taken a suspicious action.

As described above, in the system according to the third exemplary embodiment, in addition to the above-described processes in the first exemplary embodiment, suspicious action determination is performed taking into account the direction in which a person faces. Thus, even if a person who is attempting to shoplift with his/her back facing to the imaging apparatus 100 (the monitoring camera) to hide his/her hands, it is possible to determine his/her suspicious action with high accuracy.

In the third exemplary embodiment, as an example, the direction in which a person faces is estimated based on the trajectory information. However, the present disclosure is not limited to this method, and similar advantageous effects can be produced by separately providing a direction estimation unit that estimates the direction in which a person faces from the appearance of the person in the image.

Next, a hardware configuration example of the image processing apparatus 200 for implementing the processes by the functional units in each of the above-described exemplary embodiments will be described with reference to FIG. 6. The functional units of the image processing apparatus 200 may be implemented not only by hardware illustrated in FIG. 6 but also by software. Another apparatus may have one or more functions of the image processing apparatus 200 according to each of the above-described exemplary embodiments.

The image processing apparatus 200 in each of the above-described exemplary embodiments has a central processing unit (CPU) 600, a random-access memory (RAM) 610, a read only memory (ROM) 620, a hard disk drive (HDD) 630, and an interface (I/F) 640.

The CPU 600 is a central processing unit that has centralized control over the image processing apparatus 200. The RAM 610 temporarily stores computer programs to be executed by the CPU 600. The RAM 610 provides a work area for the CPU 600 to execute processing. The RAM 610 serves as a frame memory or as a buffer memory, for example.

The ROM 620 stores programs for the CPU 600 to control the image processing apparatus 200. The programs stored in the ROM 620 are loaded into the RAM 610 and executed by the CPU 600 so that the above-described processes by the functional units of the image processing apparatus 200 in each of the exemplary embodiments are carried out. The HDD 630 is a storage device that stores image data and data such as results of suspicious action detection. The 640 communicates with external apparatuses via a network 140 in accordance with Transmission Control Protocol/Internet Protocol (TCP/IP) or HyperText Transfer Protocol (HTTP).

Figure 6:
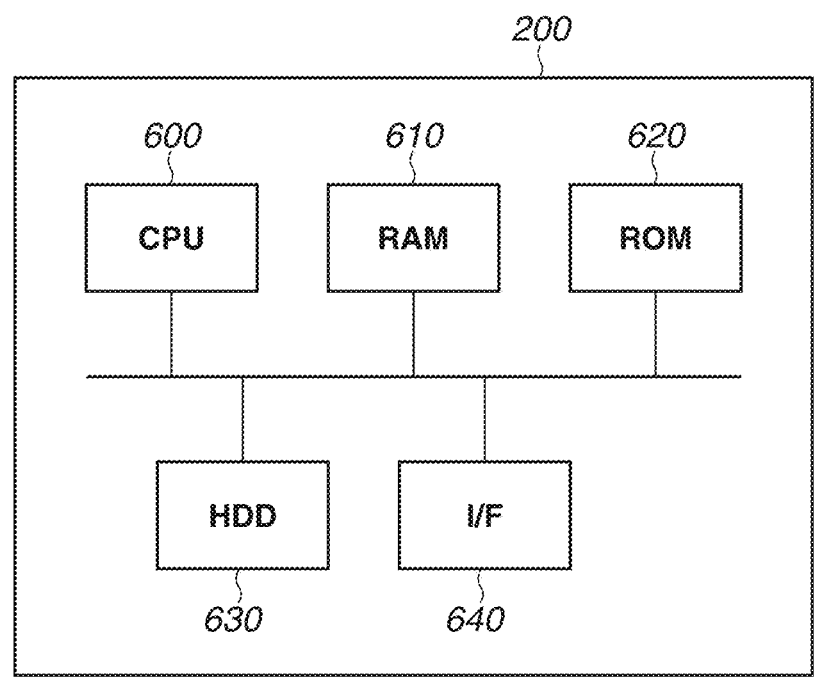
FIG. 6 is a diagram illustrating a hardware configuration example.

FIG. 6 illustrates an example where the CPU 600 executes the above-described processes of the functional units. Alternatively, dedicated hardware may perform at least some of the processes instead of the CPU 600. For example, a graphics processing unit (IPU) may perform the process of displaying a graphical user interface (GUI) and image data on a monitor 130. A direct memory access (DMA) controller, serving as a transfer apparatus, may perform the process of reading a program code from the ROM 620 and loading in the RAM 610.

The present disclosure can also be realized by the process of supplying programs for implementing one or more functions in the above-described exemplary embodiments to a system or an apparatus via a network or a storage medium, and reading and executing the programs by one or more processors in a computer of the system or apparatus. The present disclosure can also be realized by circuits (for example, application specific integrated circuits (ASICs)) that implement one or more functions.

The above-described exemplary embodiments are all mere specific examples for carrying out the present disclosure, and the technical scope of the present disclosure should not be interpreted in a limited way due to these exemplary embodiments. That is, the present disclosure can be carried out in various forms without departing from the technical ideas or main features of the present disclosure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-101572, filed Jun. 11, 2020, which is hereby incorporated by reference herein in its entirety.

What is claimed is:

1. An image processing apparatus comprising:
one or more processors; and
one or more memories storing executable instructions that, when executed by the one or more processors, cause the one or more processors to perform functions of:

a detection and tracking unit configured to detect and track a person by using an image obtained through capturing of a moving image;
an orientation detection unit configured to detect a face orientation of the person; and
an action detection unit configured to detect a suspicious action of the person, based on a cumulative value of an amount of time-series change in the face orientation based on the magnitude and abruptness of change in one or more facial angles.

2. The image processing apparatus according to claim 1, further comprising a storage unit configured to store, in the one or more memories, trajectory information representing movement of a plurality of persons detected by the detection and tracking unit,
wherein the action detection unit determines whether the person has taken a suspicious action, based on the face orientation and the trajectory information of the plurality of persons.

3. The image processing apparatus according to claim 2, wherein the action detection unit determines, based on the face orientation and the trajectory information, whether the person has looked in a direction of high visibility in which no object obstructing vision is present within a certain distance from the person in a line-of-sight direction of the person with respect to a certain direction.

4. The image processing apparatus according to claim 3, wherein the action detection unit determines whether the person has looked in the direction of high visibility with the certain direction set to a direction toward a region where movement trajectories of persons are statistically present.

5. The image processing apparatus according to claim 4, wherein the region where the movement trajectories of the persons are statistically present is a region that is set based on trajectory information for a predetermined period in the past and where movement trajectories of persons accounting for a predetermined percentage or more of a plurality of persons appearing in the image are statistically present.

6. The image processing apparatus according to claim 3, wherein a weight is set to each of a plurality of the directions of high visibility, and the action detection unit performs the detection of the suspicious action based on the weight set to each of the plurality of directions of high visibility.

7. The image processing apparatus according to claim 6, wherein the weight is set in accordance with a type of equipment in each of the plurality of directions of high visibility.

8. The image processing apparatus according to claim 6, wherein the weight is set based on features of a person who has taken a suspicious action in the past.

9. The image processing apparatus according to claim 2, wherein the action detection unit detects whether the face orientation of the person is forward-facing to an imaging apparatus performing the image capturing or is backward-facing with a back of the person facing the imaging apparatus, and changes a combination of the trajectory information and the face orientation of the person between a case where the person is forward-facing and a case where the person is backward-facing to detect the suspicious action of the person.

10. The image processing apparatus according to claim 1, wherein the orientation detection unit detects that the face orientation has abruptly changed in a case where at least one of a plurality of angles indicating the face orientation exceeds a threshold value.

11. The image processing apparatus according to claim 1,
wherein the detection and tracking unit performs a process of detecting and tracking the person at a frame rate of the moving image,
wherein the orientation detection unit performs a process of detecting the face orientation of the person at a low frame rate after the number of frames in the moving image is reduced, and
wherein the action detection unit performs a process of detecting the suspicious action of the person at the low frame rate.

12. The image processing apparatus according to claim 1, further comprising an identifying unit configured to identify, based on movement trajectories of a plurality of persons obtained in a predetermined past period, a specific direction that is from the person toward a region where the movement trajectories of the plurality of persons are statistically present,
wherein the action detection unit detects the suspicious action if the person has looked in the specific direction.

13. An image processing method that is executed by an image processing apparatus, comprising:
detecting and tracking a person by using an image obtained through capturing of a moving image;
detecting a face orientation of the person; and
detecting a suspicious action of the person, based on a cumulative value of an amount of time-series change in the face orientation based on the magnitude and abruptness of change in one or more facial angles.

14. A non-transitory storage medium storing instructions that, when executed by one or more processors, causes an image processing apparatus to perform an image processing method comprising:
detecting and tracking a person by using an image obtained through capturing of a moving image;
detecting a face orientation of the person; and
detecting a suspicious action of the person, based on a cumulative value of an amount of time-series change in the face orientation based on the magnitude and abruptness of change in one or more facial angles.

* * * * *